(12) United States Patent
Biran et al.

(10) Patent No.: US 7,603,490 B2
(45) Date of Patent: Oct. 13, 2009

(54) BARRIER AND INTERRUPT MECHANISM FOR HIGH LATENCY AND OUT OF ORDER DMA DEVICE

(75) Inventors: Giora Biran, Zichron-Yaakov (IL); Luis E. De la Torre, Austin, TX (US); Bernard C. Drerup, Austin, TX (US); Jyoti Gupta, Austin, TX (US); Richard Nicholas, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 11/621,776

(22) Filed: Jan. 10, 2007

(65) Prior Publication Data

US 2008/0168191 A1   Jul. 10, 2008

(51) Int. Cl.
*G06F 13/28* (2006.01)
*G06F 13/32* (2006.01)

(52) U.S. Cl. .......................................... 710/23; 710/24
(58) Field of Classification Search ................... 710/23, 710/24
See application file for complete search history.

(56) References Cited

U.S. PATENT DOCUMENTS

| | | | |
|---|---|---|---|
| 6,848,029 | B2 | 1/2005 | Coldewey |
| 6,981,074 | B2 | 12/2005 | Oner et al. |
| 7,076,578 | B2 | 7/2006 | Poisner et al. |
| 7,218,566 | B1 | 5/2007 | Totolos, Jr. et al. |
| 2003/0172208 | A1 | 9/2003 | Fidler |
| 2004/0034718 | A1 | 2/2004 | Goldenberg et al. |
| 2004/0187122 | A1* | 9/2004 | Gosalia et al. ............. 718/100 |
| 2005/0027902 | A1* | 2/2005 | King et al. .................. 710/24 |
| 2005/0108446 | A1 | 5/2005 | Inogai |
| 2006/0206635 | A1 | 9/2006 | Alexander et al. |
| 2007/0073915 | A1 | 3/2007 | Go et al. |

(Continued)

FOREIGN PATENT DOCUMENTS

CN    1794214 A    6/2006

(Continued)

OTHER PUBLICATIONS

U.S. Appl. No. 11/532,562, filed Sep. 18, 2006, Biran et al.

(Continued)

*Primary Examiner*—Henry W. H. Tsai
*Assistant Examiner*—Hyun Nam
(74) *Attorney, Agent, or Firm*—Stephen R. Tkacs; Stephen J. Walder, Jr.; Matthew B. Talpis

(57) ABSTRACT

A direct memory access (DMA) device includes a barrier and interrupt mechanism that allows interrupt and mailbox operations to occur in such a way that ensures correct operation, but still allows for high performance out-of-order data moves to occur whenever possible. Certain descriptors are defined to be "barrier descriptors." When the DMA device encounters a barrier descriptor, it ensures that all of the previous descriptors complete before the barrier descriptor completes. The DMA device further ensures that any interrupt generated by a barrier descriptor will not assert until the data move associated with the barrier descriptor completes. The DMA controller only permits interrupts to be generated by barrier descriptors. The barrier descriptor concept also allows software to embed mailbox completion messages into the scatter/gather linked list of descriptors.

20 Claims, 8 Drawing Sheets

U.S. PATENT DOCUMENTS

2007/0074091 A1 3/2007 Go et al.
2007/0079185 A1 4/2007 Totolos, Jr.
2007/0162652 A1 7/2007 Go et al.
2007/0204091 A1 8/2007 Hofmann et al.

OTHER PUBLICATIONS

U.S. Appl. No. 11/621,789, filed Jan. 10, 2007, Biran et al.

* cited by examiner

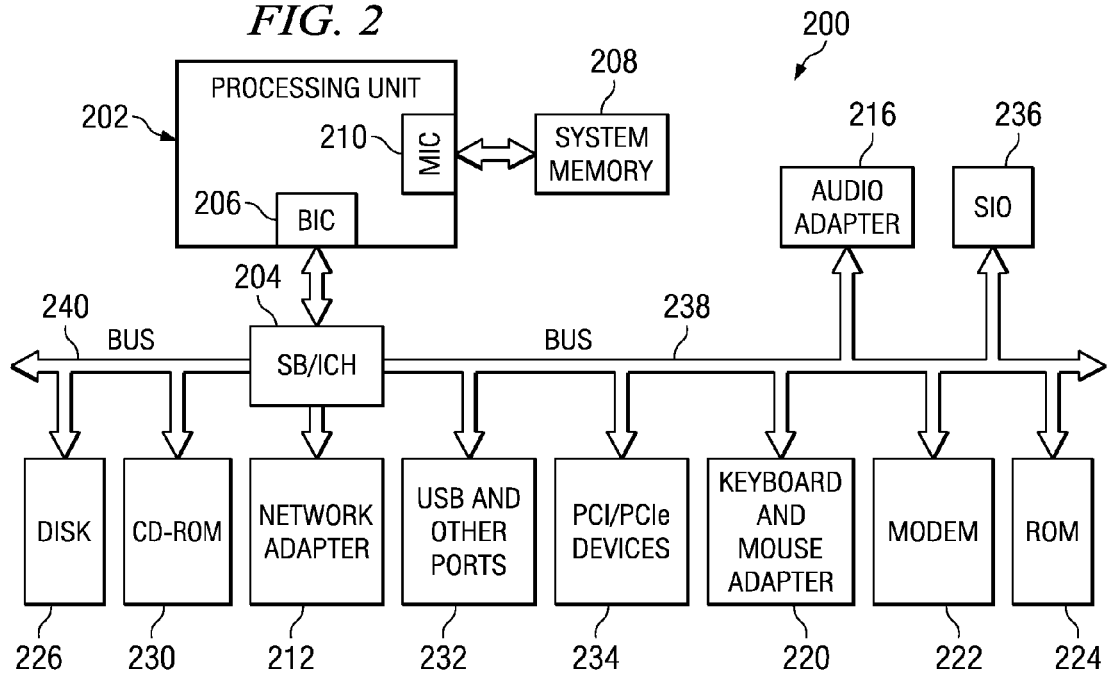
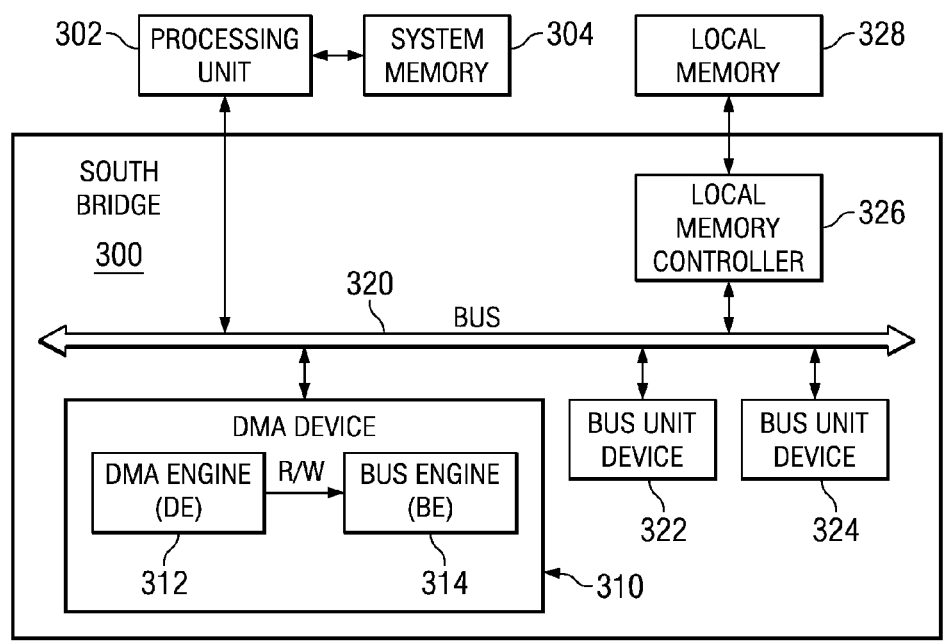

FIG. 5A

| SOURCE ADDRESS | DESTINATION ADDRESS | SIZE | BARRIER BIT | INTERRUPT BIT |
|---|---|---|---|---|
| 502 | 504 | 506 | 508 | 510 |

DESCRIPTOR 500

FIG. 5B

| SOURCE ADDRESS | DESTINATION ADDRESS | SIZE | CHANNEL ID | BARRIER ATTRIBUTE | BARRIER TAG | INTERRUPT BIT |
|---|---|---|---|---|---|---|
| 552 | 554 | 556 | 558 | 560 | 562 | 564 |

DMA REQUEST ATTRIBUTES 550

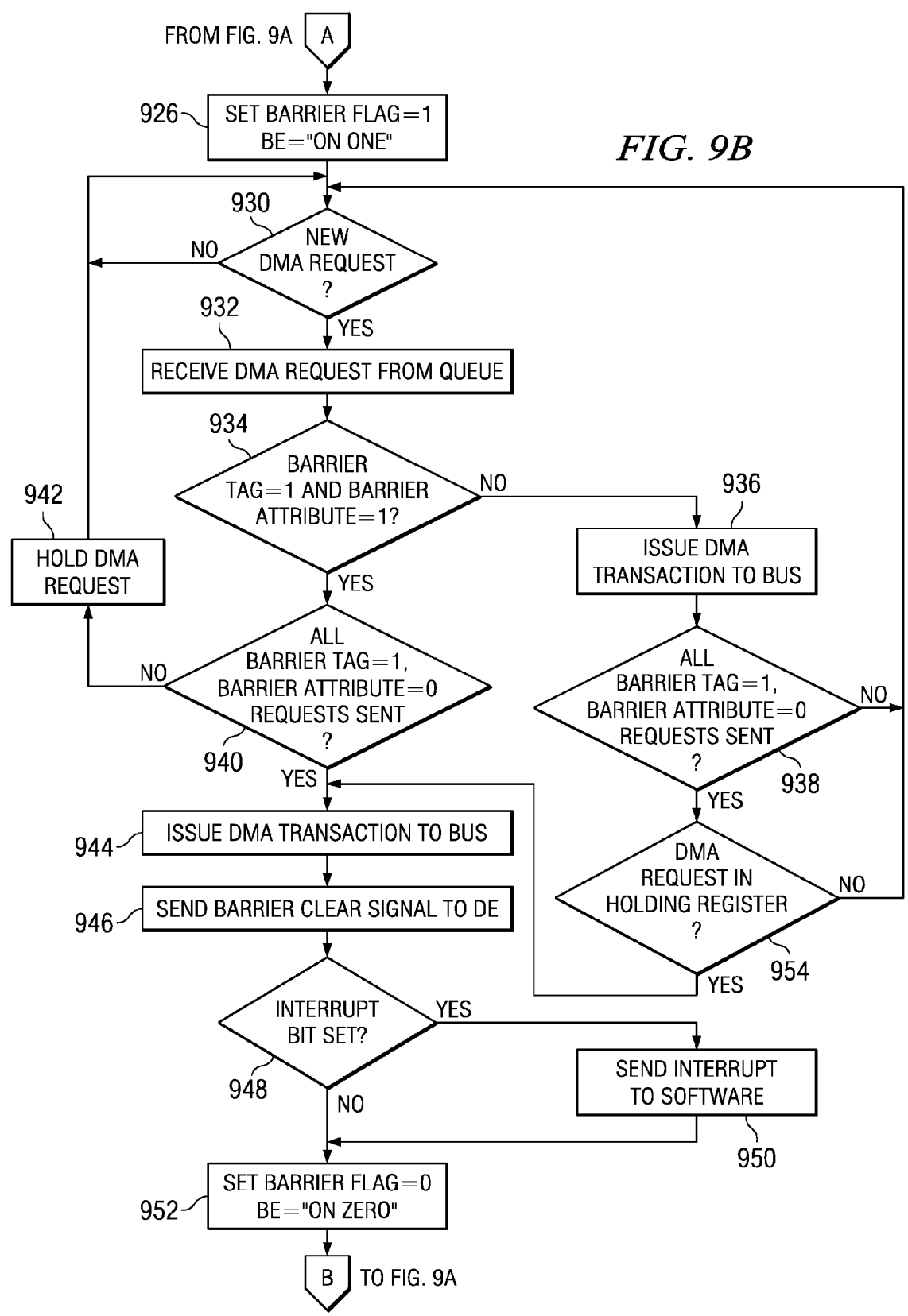

BARRIER AND INTERRUPT MECHANISM FOR HIGH LATENCY AND OUT OF ORDER DMA DEVICE

BACKGROUND

1. Technical Field

The present application relates generally to an improved data processing system and method. More specifically, the present application is directed to a direct memory access controller with a barrier and interrupt mechanism for high latency and out of order direct memory access device.

2. Description of Related Art

Many system-on-a-chip (SOC) designs contain a device called a direct memory access (DMA) controller. The purpose of DMA is to efficiently move blocks of data from one location in memory to another. DMA controllers are usually used to move data between system memory and an input/output (I/O) device, but are also used to move data between one region in system memory and another. A DMA controller is called "direct" because a processor is not involved in moving the data.

Without a DMA controller, data blocks may be moved by having a processor copy data piece-by-piece from one memory space to another under software control. This usually is not preferable for large blocks of data. When a processor copies large blocks of data piece-by-piece, it Is slow because the processor does not have large memory buffers and must move data in small inefficient sizes, such as 32-bits at a time. Also, while the processor is doing the copy, it is not free to do other work. Therefore, the processor is tied up until the move is completed. It is more efficient to offload these data block moves to a DMA controller, which can do them much faster and in parallel with other work.

DMA controllers usually have multiple "channels." As used herein, a "channel" is an independent stream of data to be moved by the DMA controller. Thus, DMA controllers may be programmed to perform several block moves on different channels simultaneously, allowing the DMA device to transfer data to or from several I/O devices at the same time.

Another feature that is typical of DMA controllers is a scatter/gather operation. A scatter/gather operation is one in which the DMA controller does not need to be programmed by the processor for each block of data to be moved from some source to some destination. Rather, the processor sets up a descriptor table or descriptor linked list in system memory. A descriptor table or linked list is a set of descriptors. Each descriptor describes a data block move, including source address, destination address, and number of bytes to transfer. Non-scatter/gather block moves, which are programmed via the DMA registers directly, are referred to as "single programming" DMA block moves.

A linked list architecture of a DMA controller is more flexible and dynamic than the table architecture. In the linked list architecture, the processor refers one of the DMA channels to the first descriptor in the chain, and each descriptor in the linked list contains a pointer to the next descriptor in memory. The descriptors may be anywhere in system memory, and the processor may add onto the list dynamically as the transfers occur. The DMA controller automatically traverses the table or list and executes the data block moves described by each descriptor until the end of the table or list is reached.

Modern DMA devices may be connected to busses that allow read data to be returned out of order. That is, the DMA controller may issue several read transactions to the bus that are all part of the same or different data block moves and the data may be returned by the target devices in a different order than the order in which the reads were issued. Typically, each read transaction is assigned a "tag" number by the initiator so that when read data comes back from the bus, the initiator will know based on the tag to which transaction the data belongs.

The transaction queued can be completed in any order. This allows the DMA device to achieve the best performance by queuing many transactions to the bus at once, including queuing different transactions to different devices. The read transactions can complete in any order and their associated writes started immediately when the read data arrives. Allowing the reads and their associated writes to compete in any order achieves the best performance possible on a given bus, but can cause certain problems.

When system software sets up a large block of memory to be moved between an I/O device and memory or from one region in memory to another, the software will want to know when that block of data has been completely moved so that it can act on the data. Because the processor or some other device may act on the data when the transfer is complete, it is imperative that the interrupt not be generated until all of the data associated with the move has been transferred; otherwise, the processor may try to act on data that is not yet transferred and will, thus, read incorrect data. With out of order execution, a DMA device cannot simply generate an interrupt when the last transaction in a block completes.

Some systems work by having "completion codes" moved to "mailboxes" when a series of data moves have been completed. A mailbox is a messaging device that acts as a first-in-first-out (FIFO) for messages. When the DMA controller delivers messages to the mailbox by writing to the mailbox address, the DMA controller may deliver messages to the processor in order. Messages are typically small, on the order of eight or sixteen bytes. When software sets up a series of block moves in a scatter/gather list, the software can input the completion messages in the descriptor linked list so that the DMA device may move both the data blocks and the completion code messages via the same list of scatter/gather descriptors.

However, in order for software to work correctly, when the DMA controller writes a completion message to the mailbox, it is imperative that all descriptors prior to the descriptor writing to the mailbox have completed, because the mailbox, like an interrupt, tells the processor that a certain amount of data has been moved. Because all transactions can complete out of order for performance, the DMA device can write a completion message to the mailbox prior to some of the other transactions from previous descriptors having completed unless there is a mechanism to prevent it.

SUMMARY

In one illustrative embodiment, a method is provided in a direct memory access engine in a direct memory access device for performing a direct memory access block move. The method comprises receiving a direct memory access block move descriptor. The direct memory access block move descriptor indicates a source and a target. The direct memory access block move descriptor is identified as a barrier descriptor. The method further comprises converting the direct memory access block move descriptor into one or more direct memory access requests for the direct memory access block move descriptor, identifying a last direct memory access request within the one or more direct memory access requests, and setting a barrier attribute associated with the last direct memory access request. For each given direct memory access request in the one or more direct memory access requests, the method determines whether the barrier attribute is set for the given direct memory access request, determines whether a barrier is pending for a channel associated with the given direct memory access request if the barrier attribute is set, and issues the given direct memory access request to a bus engine in the direct memory access device if a barrier is not pending for the channel associated with the given direct memory access request.

In another illustrative embodiment, a method is provided in a bus engine in a direct memory access device for performing a direct memory access block move. The method comprises receiving a direct memory access request from a direct memory access queue. A direct memory access engine in the direct memory access device converts a direct memory access block move descriptor into one or more direct memory access requests, sets a barrier attribute for a last direct memory access request within the one or more direct memory access requests to mark a barrier, and stores the one or more direct memory access requests in the direct memory access queue. The method further comprises determining whether the direct memory access request has a barrier attribute set, determining whether all direct memory access requests before the barrier have completed if the direct memory access request has a barrier attribute set, and holding the direct memory access request from completing if all direct memory access requests before the barrier have not completed.

In yet another illustrative embodiment, a direct memory access device comprises a direct memory access engine and a bus engine. The direct memory access engine is configured to receive a direct memory access block move descriptor. The direct memory access block move descriptor indicates a source and a target. The direct memory access block move descriptor is identified as a barrier descriptor. The direct memory access engine is further configured to convert the direct memory access block move descriptor into one or more direct memory access requests for the direct memory access block move descriptor, identify a last direct memory access request within the one or more direct memory access requests, set a barrier attribute for the last direct memory access request to mark a barrier, and issue the one or more direct memory access requests to a direct memory access queue. The bus engine is configured to receive a direct memory access request from the direct memory access queue determine whether the received direct memory access request has a barrier attribute set, determine whether all direct memory access requests before the barrier have completed if the received direct memory access request has a barrier attribute set, and hold the received direct memory access request from completing if all direct memory access requests before the barrier have not completed.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is a block diagram of an exemplary data processing system in which aspects of the illustrative embodiments may be implemented;

FIG. 3 is a block diagram illustrating a south bridge in accordance with an illustrative embodiment;

FIG. 5A depicts an example descriptor in accordance with an illustrative embodiment;

FIG. 5B depicts an example of DMA request attributes in accordance with an illustrative embodiment;

FIGS. 9A and 9B are flowcharts illustrating ion of a bus engine enforcing a barrier in dance with an illustrative embodiment.

DETAILED DESCRIPTION OF THE ILLUSTRATIVE EMBODIMENTS

Figure 1:
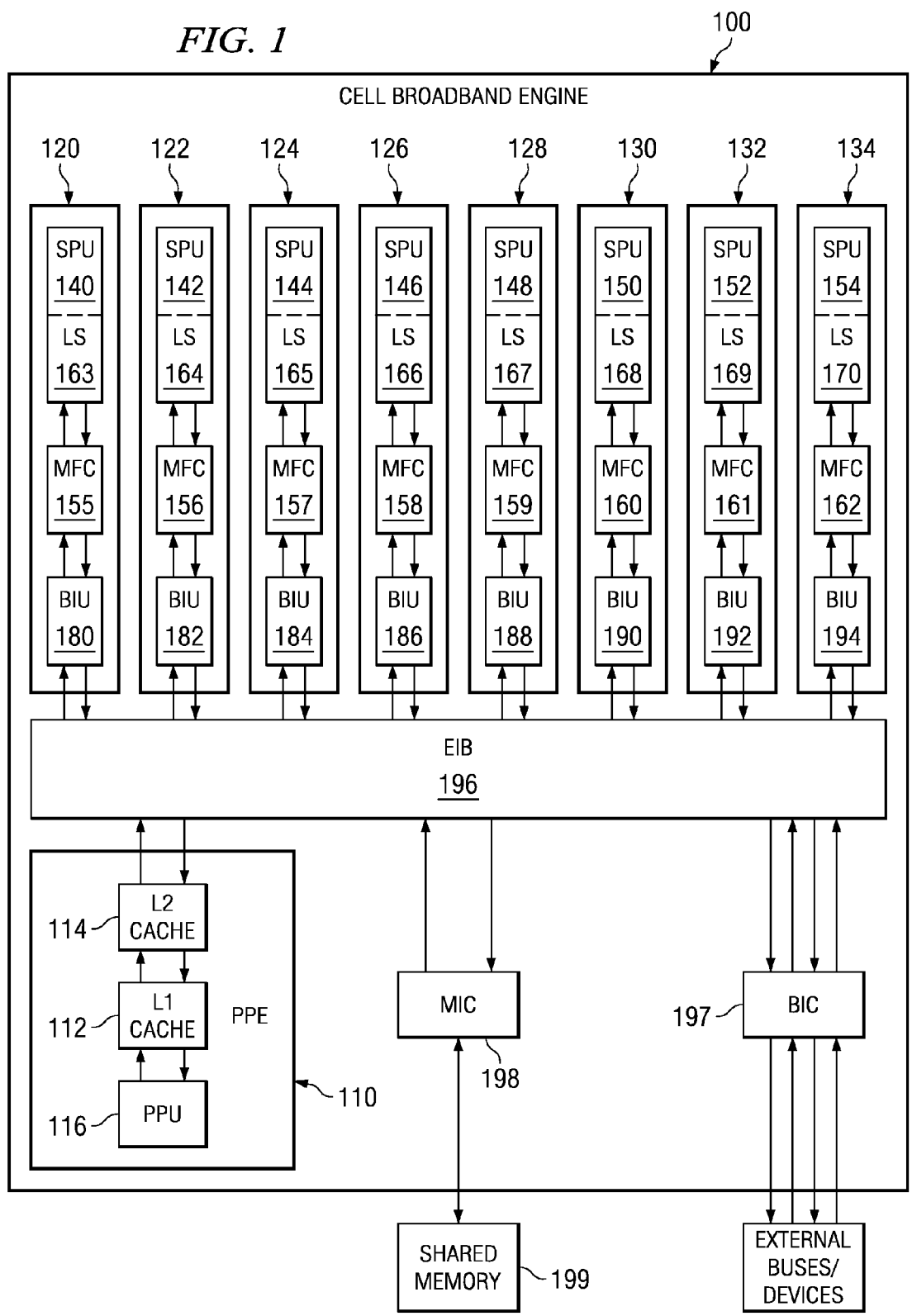
FIG. 1 is an exemplary block diagram of a data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is an exemplary block diagram of a data processing system in which aspects of the illustrative embodiments may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read-write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With reference now to FIG. 2, a block diagram of an exemplary data processing system is shown in which aspects of the illustrative embodiments may be implemented. In the depicted example, data processing system 200 employs a hub architecture including south bridge and input/output (I/O) controller hub (SB/ICH) 204. Processing unit 202 is connected to system memory 208 via memory interface controller (MIC) 210. Processing unit 202 is connected to SB/ICH 204 through bus interface controller (BIC) 206.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 202. The operating system coordinates and provides control of various components within the data processing system 200 in FIG. 2. As a client, the operating system may be a commercially available operating system. An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both, while LINUX is a trademark of Linus Torvalds in the United States, other countries, or both). Data processing system 200 may include a plurality of processors in processing unit 202. Alternatively, a single processor system may be employed.

Instructions for the operating system, the object-oriented programming system, and applications or programs are located on storage devices, such as HDD 226, and may be loaded into main memory 208 for execution by processing unit 202. The processes for illustrative embodiments of the present invention may be performed by processing unit 202 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), video game console, or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

South bridge 204 may include a direct memory access (DMA) controller. DMA controllers are usually used to move data between system memory and an input/output (I/O) device, but are also used to move data between one region in system memory and another. High latency devices present unique challenges if high bus utilization is desired. When talking to a high latency device, there must be enough simultaneous transactions outstanding so that the time it takes to receive data from the high latency device is less than or equal to the amount of time it takes to transfer the data from all of the other outstanding transactions queued ahead of it. If this criterion is met, then there seldom will be gaps or stalls on the bus where the DMA is waiting for data and does not have any other data available to transfer.

With trends towards further integration, particularly with systems-on-a-chip, many devices in FIG. 2 may be integrated within south bridge 204. For example, a single bus may be integrated within south bridge 204. Also, controllers and interfaces, such as USB controller, PCI and PCIe controllers, memory controllers, and the like, may be integrated within south bridge 204 and attached to the internal bus. Furthermore, south bridge 204 may include a memory controller to which a memory module may be connected for local memory. Also note that processing unit 202 may include an internal bus, such as EIB 196 in FIG. 1, through which the DMA device may access system memory 208.

FIG. 3 is a block diagram illustrating a south bridge in accordance with an illustrative embodiment. Processing unit 302, for example, issues DMA commands to bus 320 in south bridge 300. DMA device 310 within south bridge 300 may then execute the DMA commands by performing read operations from source devices, such as bus unit device 322, and write operations to target devices, such as bus unit device 324, In an alternative example, a DMA command may request to move a block of data from bus unit device 322 to system memory 304, or according to yet another example, a DMA command may request to move a block of data from memory 304 to bus unit device 324. Bus unit device 322 and bus unit device 324 may be, for example, memory controllers, USB controllers, PCI controllers, storage device controllers, and the like, or combinations thereof.

The source devices and target devices may include low latency devices, such as memory, and high latency devices, such as hard disk drives. Note, however, that devices that are generally low latency, such as memory devices, may also be high latency in some instances depending upon their locations within the bus and bridge hierarchy. Many of the components of south bridge 300 are not shown for simplicity. A person of ordinary skill in the art will recognize that south bridge 300 will include many more features and functions not illustrated in FIG. 3.

In south bridge 300, DMA device 310 comprises DMA engine (DE) 312 and bus engine (BE) 314. A specialized read-write (RW) command allows DE 312 to more efficiently queue transactions to BE 314. Using a more standard implementation, the DE would micromanage the BE by specifying every transaction that the BE is to execute on the bus. However, in the illustrative embodiment, the specialized RW command allows DE 312 to specify both a read and a write at the same time so that DE 312 can more efficiently control the moving of data blocks.

BE 314 may read the DMA commands, such as block move requests, issued from processing unit 302 via bus 320. Processing unit 302 may issue DMA commands directly to DMA device 310. Alternatively, processing unit 302 may issue DMA commands using a scatter/gather list, which may be a table or linked list in system memory 304 or in local memory 328. In the latter case, BE 314 may simply read a descriptor from the scatter/gather list to receive the next DMA command. DMA device 310 may use local memory 328, connected through local memory controller 326, as a working memory.

In accordance with an illustrative embodiment, as illustrated in FIG. 3, for example, a DMA device is structured as a loosely coupled DMA engine (DE) and a bus engine (BE). The DE breaks the programmed data block moves into separate transactions, interprets the scatter/gather descriptors, and arbitrates among channels. The BE understands the bus protocol of the bus to which the DMA device is attached and runs all of the transactions sent by the DE. The BE must support enough simultaneous transactions, and, thus, enough buffers, to keep the pipeline of data flow from stalling. The DE queues transactions to the BE and can get far ahead of the BE per the BE's buffer space. The BE throttles the DE via simple request/acknowledge handshaking.

The DE does not know, or need to know, how many buffers the BE has implemented; therefore, different BEs can be used with the same DE to support different latency environments or to attach to different busses. For maximum scalability, the BE may be constructed as logically independent "BE units," each responsible for managing one buffer and one transaction for the DE. The number of BE units may be a configurable synthesis parameter.

As long as the DE receives an acknowledge for its current request, it can make another request. When the BE is out of available buffers, it withholds the acknowledge of the DE's current request, which prevents the DE from requesting any more transactions. When resources free up in the BE, it will activate the acknowledge to the DE, and then the DE can request another transaction.

The BE contains a general pool of buffers. For example, if the BE contains 16 buffers, all 16 may be used by one DMA channel, or they may be allocated any way the DE needs them between the channels. The DE queues transactions from any of the channels to the BE. The DE only stops queuing transactions when it has no more work to do or when the BE withholds the acknowledge indicating that it is out of available buffer space.

The BE runs all the queued transactions according to the bus protocol and handles possible bus situations, such as transaction data coming back out of order and retried transactions. A DMA that handles out of order data is optimized for data block moves for which there is no meaning to the order of the sub-blocks. There are some applications like networking and video stream transport where the data must be moved in order.

There may be a simple interface between the DE and the BE in which the DE queues transactions to the BE. The BE runs the transactions for the DE until the DE has caused all programmed data blocks to be moved. A DE may cause all of the data blocks to be moved by specifying each read and each write to the BE, which performs those reads and writes on the bus. The DE arbitrates among the channels and usually interleaves reads and writes from the various channels in a fair way so that data from all of the channels can transfer more or less simultaneously. There are various channel arbitration priority schemes that can be implemented.

Because a DMA involves moving data, each read transaction that the DE performs from the source address must eventually be followed by a corresponding write transaction to a destination address. And because the DMA moves data rather than processing data, the data that was transferred by the read transaction is the same data that is transferred by the corresponding write transaction. The data is not modified in any way. Therefore, in accordance with an illustrative embodiment, the DE and BE may make the process more efficient by using a combined read-write (RW) command that can be queued between the DE and the BE.

A RW transaction specifies both a read and a corresponding write at the same time. When the DE queues a RW transaction to the BE, it specifies a source address, a destination address, and a byte count versus just a single address and a byte count as with a traditional read or write transaction. The RW command simplifies the architecture of the DE, because the DE does not have to manage both a read and a write phase for each transaction it queues. Rather, the DE simply queues a single RW transaction and can then "forget" about that transaction. The BE runs a separate read and write for each RW transaction queued by the DE.

In accordance with one illustrative embodiment, a barrier and interrupt mechanism allows interrupt and mailbox operations to occur in such a way that ensures correct operation, but still allows for high performance out-of-order data moves to occur whenever possible. Certain descriptors are defined to be "barrier descriptors." When the DMA device encounters a barrier descriptor, it ensures that all of the previous descriptors complete before the barrier descriptor completes. The DMA device further ensures that any interrupt generated by a barrier descriptor will not assert until the data move associated with the barrier descriptor completes.

The DMA controller only permits interrupts to be generated by barrier descriptors. Single programming data block moves are treated as barrier descriptors in this regard. This allows software to reliably use interrupts it receives, because by the time it receives the interrupt, all of the data that it was expecting to be moved is guaranteed to have been moved.

The barrier descriptor concept also allows software to embed mailbox completion messages into the scatter/gather linked list of descriptors. The mechanism simply labels each completion message as a barrier descriptor. The mechanism ensures that those completion messages are not delivered until all previous descriptors have completed.

The barrier and interrupt mechanism creates a barrier that enforces order without unnecessarily enforcing transaction ordering and causing unnecessary stalls. The mechanism stalls only where needed—only the last write transaction of a barrier descriptor has the potential of being stalled, the corresponding read is not stalled. The DMA controller may execute descriptors on the "other side" of the barrier descriptor while the barrier is enforcing order for all previous descriptors. In other words, encountering a barrier descriptor does not cause the DMA controller to stall subsequent descriptors, except when it encounters a second outstanding barrier descriptor.

Figure 4:
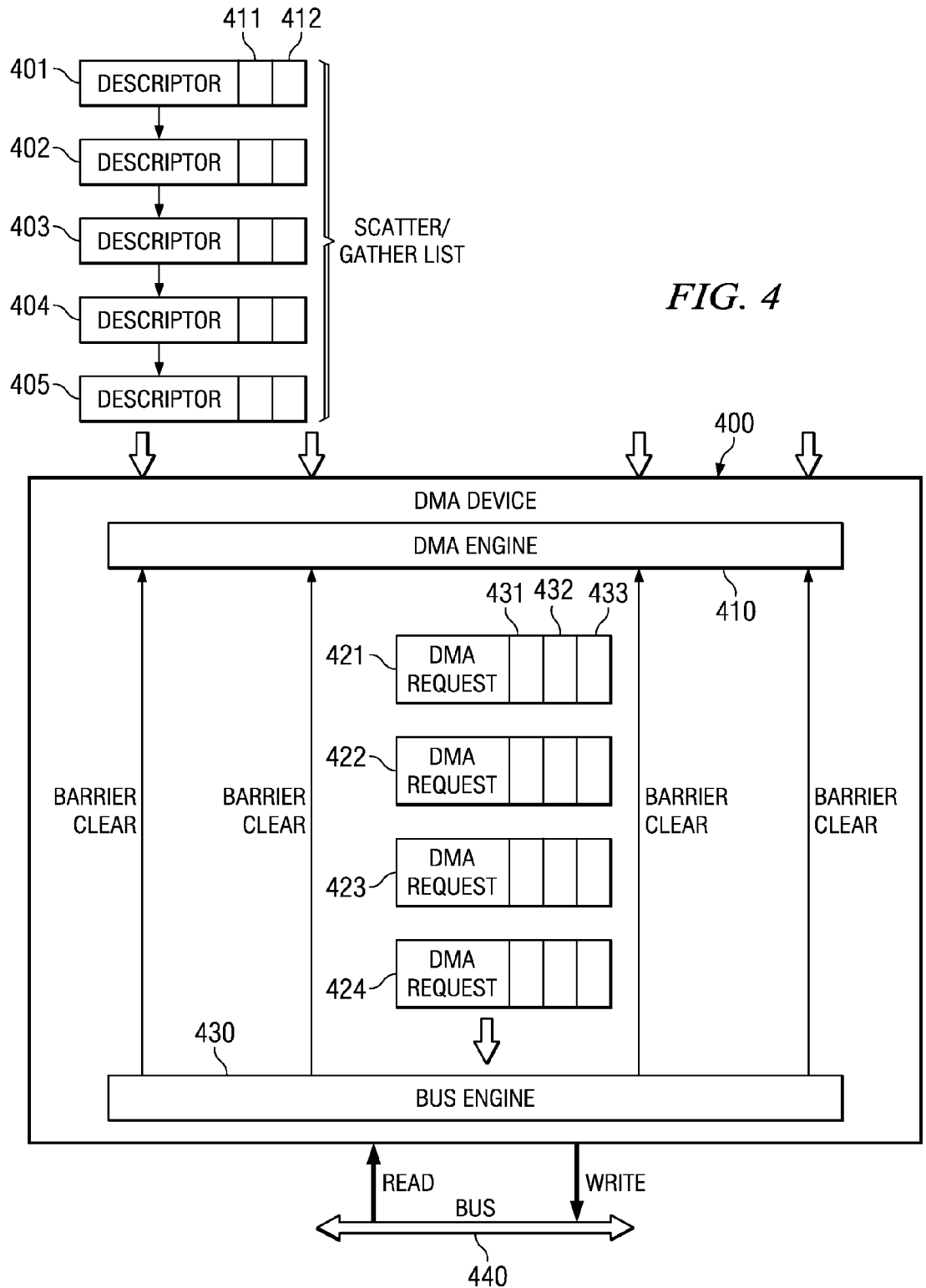
FIG. 4 illustrates overall operation of a direct memory access device with barrier descriptors in accordance with an illustrative embodiment.

FIG. 4 illustrates overall operation of a direct memory access device with barrier descriptors in accordance with an illustrative embodiment. Direct memory access (DMA) device 400 includes DMA engine (DE) 410 and bus engine (BE) 430. A linked list of descriptors 401-405 resides in system memory. BE 430 retrieves descriptors 401-405 for DE 410 to process.

DE 410 may convert a given descriptor into one or more DMA requests. In this example, DE 410 converts a descriptor into DMA requests 421-424. As mentioned above, in accordance with one exemplary embodiment, these requests may be RW commands. Alternatively, DMA requests 421-424 may be a combination of independent reads and writes. BE 430 executes DMA requests 421-424 via bus 440.

In accordance with one exemplary embodiment, descriptors 401-405 include a barrier bit 411 and an interrupt bit 412. Barrier bit 411 is a bit in the descriptor indicating that it is a "barrier descriptor." Every descriptor has this bit field. If the barrier bit is set or asserted, a logical one (1), then the descriptor is a barrier descriptor; otherwise, it is not. A barrier descriptor is a descriptor that must complete after all previous descriptors in the scatter/gather list. Single programming DMA moves must be treated as barrier descriptors because they may generate interrupts.

Interrupt bit 412 is a bit in the descriptor indicating that the descriptor should generate an interrupt when the descriptor completes. If the interrupt bit is set or asserted, a logical one (1), then the descriptor generates an interrupt when it completes if and only if the descriptor is also a barrier descriptor. If the descriptor is not a barrier descriptor, then the state of interrupt bit 412 is a "don't care."

When DE 410 queues requests to BE 430, DE 410 also sends various attributes along with each request, such as source address, destination address, byte count (transfer size), and channel identification (ID). In accordance with an exemplary embodiment, DMA requests 421-424 also include a barrier attribute 431 and barrier tag 432. In the depicted example, DMA requests 421-424 may correspond to a given barrier descriptor.

Barrier attribute 431 is a single bit attribute that is sent with each transaction queued from DE 410 to BE 430. DE 410 sets barrier attribute 431 only for the last transaction queued for a barrier descriptor. For example, if a barrier descriptor describes a large block move that requires multiple transactions, only the last transaction of that block will have barrier attribute 431 set. The barrier attribute is used to mark which transactions in BE 430 must be sent last. DE 410 knows that it is permitted to have only one request that has the barrier attribute set to one outstanding on a given channel at any one time, because BE 430 is typically designed to support one barrier per channel.

Barrier attribute 431 does not get set for every transaction belonging to a barrier descriptor. The barrier attribute only gets set by DE 410 for the last transaction belonging to a barrier descriptor. Barrier tag 432 toggles after a transaction is sent with barrier attribute 431 set; otherwise, the state of barrier tag 433 remains constant from transaction to transaction.

When BE 430 receives a transaction with the barrier attribute set for a given channel, BE 430 must not start the write for that transaction until there are no other pending transactions for that channel (in the read or write queues). BE 430 sends a barrier clear signal for each channel. When BE 430 completes a write for a request that has the barrier attribute set, it asserts the barrier clear signal associated with the owning channel of that transaction to DE 410 indicating that DE 410 can send another barrier for the associated channel.

BE 430 must keep a flag (not shown) that corresponds to the barrier tag that it uses to determine which transactions are safe to send based on whether they are on the other side of the barrier. This flag starts out as zero (0); BE 430 is said to be "on zero."

When BE 430 is on zero and is enforcing a barrier, it must ensure that all transactions with {barrier tag, barrier attributed}=00 are sent prior to the one transaction that has {barrier tag, barrier attribute}=01 is sent. BE 430 may send transactions that have {barrier tag, barrier attribute}=10, because those are on the other side of the barrier. DE 410 will not send a transaction that has {barrier tag, barrier attribute}=11, because it will not have received a barrier clear signal.

When BE 430 does complete the write associated with the transaction that has {barrier tag, barrier attribute}=01, it sends the barrier clear signal. DE 410 then toggles the barrier tag and the next time it sends a request it will be with barrier tag=1. In this case, the flag becomes one (1); BE 430 is said to be "on one."

When BE 430 is on one and is enforcing a barrier, it must ensure that all transactions with {barrier tag, barrier attribute}=10 are sent prior to sending the one transaction that has {barrier tag, barrier attribute}=11. BE 430 may send transactions that have {barrier tag, barrier attribute}=00, because they are on the other side of the barrier; however, DE 410 will not send a request that has {barrier tag, barrier attribute}=01, because it will not have received a barrier clear signal.

DE 410 may, at the beginning, send a barrier on all channels. In the depicted example, there are four channels; however, there may be more or fewer channels depending upon the implementation. When DE 410 processes a barrier descriptor for a given channel and sends a request with the harrier attribute set, it may not send another request with the barrier attribute set for that channel until it receives the barrier clear signal associated with that channel.

Descriptor 405 may be a barrier descriptor, as stated above. In this case, the software sets barrier bit 411 in descriptor 405. If the software is configured to receive an interrupt when descriptor 405 completes, the software also sets interrupt bit 412 in descriptor 405.

When DE 410 converts descriptor 405, which in this example is a barrier descriptor, into DMA requests 421-424, DE 410 sets barrier attribute 431 for the last DMA request, in this case DMA request 424. If interrupt hit 412 is set in barrier descriptor 405, then DE 410 sets interrupt bit 433 for DMA request 424. When BE 430 completes the transaction for DMA request 424, BE 430 generates an interrupt if interrupt bit 433 is set.

Some systems work by having "completion codes" moved to "mailboxes" when a series of data moves have been completed. A mailbox is a messaging device that acts as a first-in-first-out (FIFO) for messages. When messages are delivered to the mailbox by writing to the mailbox address, the messages are then delivered in order to the processor. Messages are typically small, on the order of eight or sixteen bytes.

When software sets up a series of block moves in a scatter/gather list, such as descriptors 401-405, the software can put the completions messages right in the descriptor linked list so that the DMA device may move both the data blocks and the completion code messages via the same list of scatter/gather descriptors. DMA device 400 does not know that a DMA request is moving a completion message or that the destination is a mailbox.

In the depicted example, the completion code messages may be pointed to by descriptor 405, which is set as the barrier descriptor. That is, the software is notified, through the mailbox, that the series of block moves is completed, because descriptor 405 will be the last move to complete. In addition, the software may set interrupt bit 412 for descriptor 405.

FIG. 5A depicts an example descriptor in accordance with an illustrative embodiment. Descriptor 500 defines source address 502, destination address 504, and transfer size 506. In accordance with an illustrative embodiment, descriptor 500 also includes barrier bit 508 and interrupt bit 510. Barrier bit 508 is a bit in the descriptor indicating that it is a "barrier descriptor." Interrupt bit 510 is a bit in the descriptor indicating that the descriptor should generate an interrupt when the descriptor completes.

FIG. 5B depicts an example of DMA request attributes in accordance with an illustrative embodiment. DMA request attributes 550 include source address 552, destination address 554, transfer size 556, and channel ID 558. In accordance with an illustrative embodiment, DMA request attributes 550 may also include barrier attribute 560, barrier tag 562, and interrupt bit 564. Interrupt bit 564 informs the BE that the DMA request is a barrier descriptor that also generates an interrupt. The BE generates the interrupt when it sends the barrier clear signal.

Barrier attribute 560 is a single bit attribute that is sent with each transaction queued from the DE to the BE. The DE sets barrier attribute 560 only for the last transaction queued for a barrier descriptor. Barrier tag 562 toggles after a transaction is sent with barrier attribute 560 set; otherwise, the state of barrier tag 562 remains constant from transaction to transaction.

Figure 6:
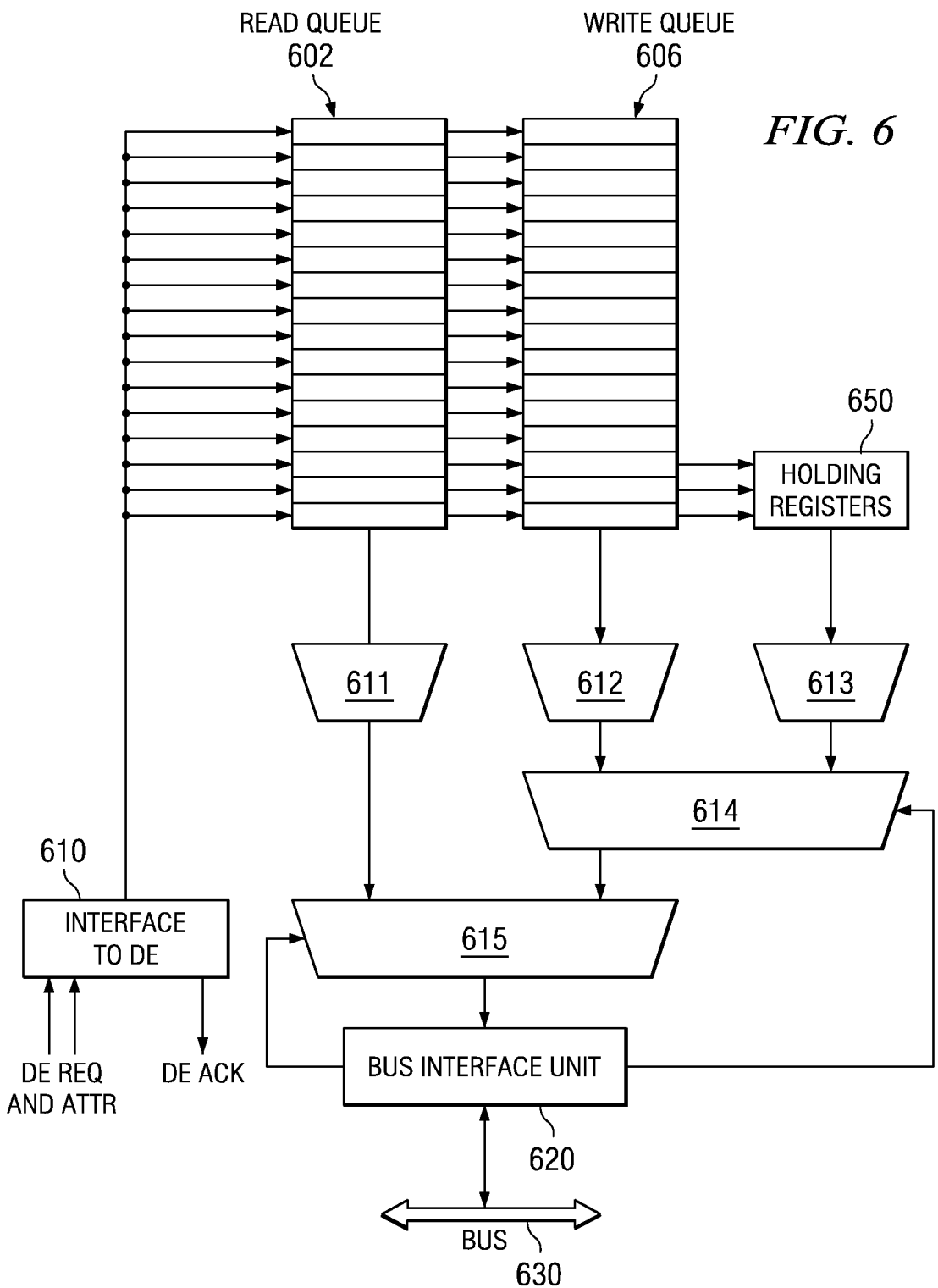
FIG. 6 illustrates an overall bus engine queue structure in accordance with one illustrative embodiment.

FIG. 6 illustrates an overall bus engine queue structure in accordance with one illustrative embodiment. Interface 610 receives DMA commands from the DMA engine, and places these commands into at least one read queue, read queue 602 in the depicted example. Each DMA move consists of a read and a write. Therefore, each move begins as a read in read queue 602. Bus interface unit (BIU) 620 may run the reads in the order they are put into read queue 602 via a FIFO mechanism.

Multiplexer 611 selects a read from read queue 602 to be run by bus interface unit 620. When BIU 620 runs a read from read queue 602, there are two possible results. The read may complete immediately. This may happen, for example, for low latency targets that are able to accept the transaction right away. If the DMA command is a combined RW command, upon completion of the read, the transaction is sent to write queue 606. In an alternative embodiment, multiple read queues may be used to handle delayed reads.

The second result that may happen when a read is run is that the read is retried. A read may be retried, for example, if the target device is busy. The retried busy transaction is then sent back to read queue 602 so that it is put in line to run again. Alternatively, a read may be retried if a "delayed read" device has queued the transaction. A device performs delayed reads if it retries the read at the same time it queues it and starts processing it. Delayed reads free up the bus while the device is processing the read.

Multiplexer 612 selects a write from write queue 606 to be run by bus interface unit 620. Writes are usually run in the order that their corresponding reads complete. When BIU 620 runs a write from write queue 606, there are two possible results. The write may complete immediately. In this case, the transaction data move specified by that transaction is complete. As soon as the write is accepted (acknowledged) by bus 630 (i.e. even before the data has been transferred on busses that do not pace writes with wait states), the associated transaction tag is "deallocated" and can be reused for a new read. With the combined RW transaction, another read using this tag may not be issued before this point, because the read and the corresponding write share a data buffer location. In fact, using the combined RW transaction described above, a given queue location points to the same data buffer location for both queues.

The second thing that may happen when a write is run is that it is retried. This may happen because the target is busy or does not have available write buffers. If the write is retried, it remains in write queue 606 to be run again. Alternatively, the BE may simply repeat a retried write immediately rather than reloading it back into write queue 606. This will not cause a deadlock, because the completion of a write cannot depend on the completion of other transactions except other writes ahead of it.

When a read completes that is the last transaction of a barrier descriptor, it is not put into write queue 606. Instead, it is put aside into holding register 650. There is one hold register per outstanding barrier that is supported. The write is then held in holding registers 650 until all transactions in that barrier descriptor without the barrier attribute set complete. When all transactions in that barrier descriptor without the barrier attribute set complete, the write is moved from holding register 650 to write queue 606.

Multiplexer 615 selects among transactions from read queue 602 and write queue 606. Bus interface unit 620 provides a selection signal to multiplexer 615 to select a transaction.

Holding registers 650 may comprise a single holding register for all DMA channels. That is, the DMA device may allow only one barrier descriptor for all channels, because having two or more barriers outstanding may be rare. Alternatively, holding registers 650 may include two or more holding registers. In one exemplary embodiment, holding registers 650 may include one holding register for each DMA channel, which would allow one barrier to be outstanding per channel. However, depending on the application for which the DMA device is used, it may even be appropriate to allow multiple barriers per channel.

Figure 7:
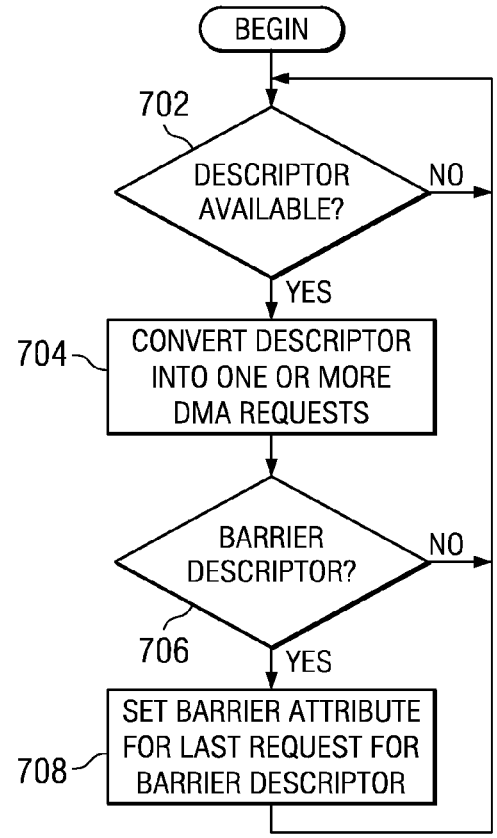
FIG. 7 is a flowchart illustrating the operation of a direct memory access engine processing descriptors in accordance with an illustrative embodiment.

FIG. 7 is a flowchart illustrating the operation of a direct memory access engine processing descriptors in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 7, operation begins and the direct memory access (DMA) engine (DE) determines whether a descriptor is available to be processed (block 602). If a descriptor is not available, operation returns to block 602 to wait until a descriptor is available.

If a descriptor is available in block 702, the DE converts the descriptor into one or more DMA requests to be issued to the BE (block 704). Thereafter, the DE determines whether the descriptor is a barrier descriptor (block 706). If the DE determines that descriptor is not a barrier descriptor, then operation returns to block 702 to determine whether another descriptor is available to be processed. If the DE determines that the descriptor is a barrier descriptor in block 706, the DE sets a barrier attribute for the last request for the barrier descriptor (block 708). Thereafter, operation returns to block 702 to determine whether another descriptor is available to be processed.

Figure 8:
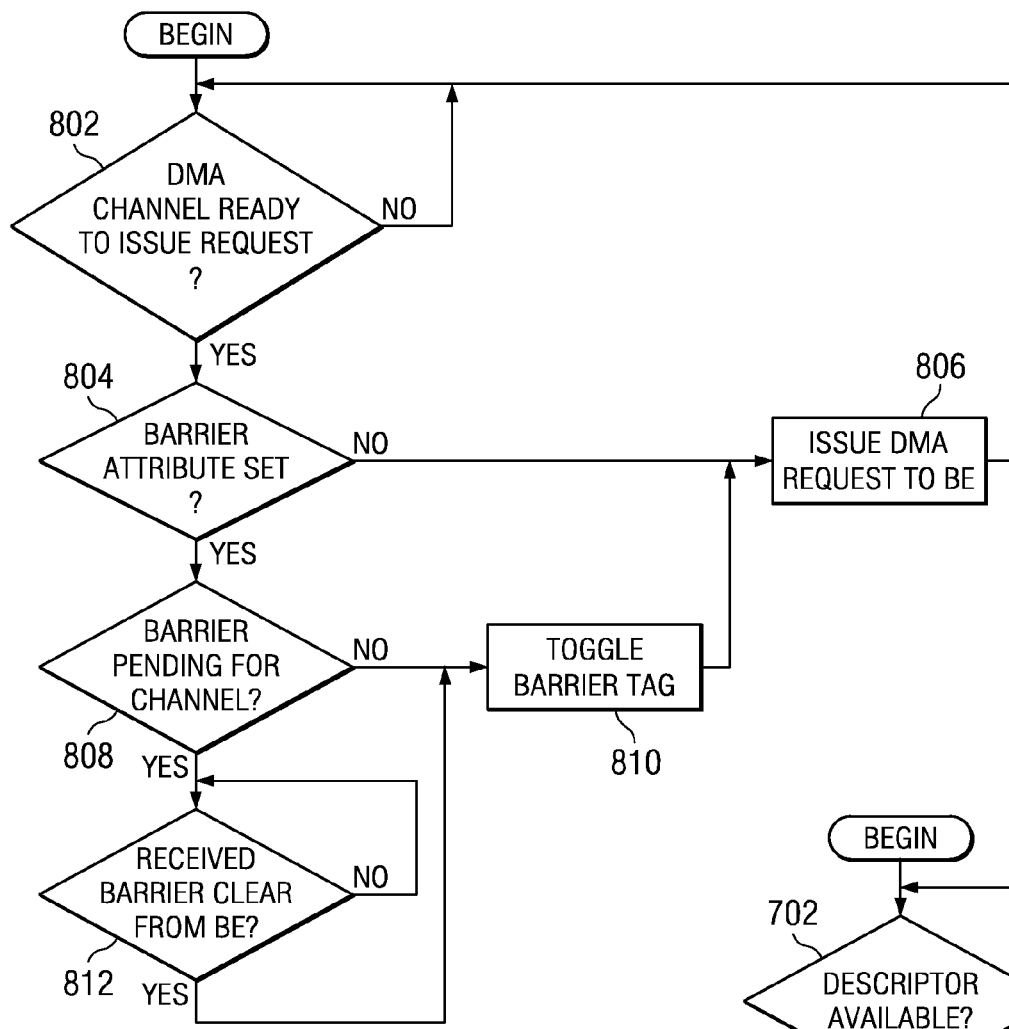
FIG. 8 is a flowchart illustrating the operation of a direct memory access engine issuing requests to a bus engine in accordance with an illustrative embodiment.

FIG. 8 is a flowchart illustrating the operation of a direct memory access engine issuing requests to a bus engine in accordance with an illustrative embodiment. Operation begins and the direct memory access (DMA) engine (DE) determines whether the DMA channel is ready to issue a DMA request to the bus engine (block 802). If a DMA channel is not ready to issue a request, then operation returns to block 802 to wait until the DMA channel is ready to issue a request.

If the DMA channel is ready to issue a request in block 802, the DE determines whether the barrier attribute is set for the request (block 804). If the barrier attribute is not set, the DE issues the DMA request to the BE (block 806), and operation returns to block 802 to wait until a DMA request is ready to issue on the channel.

If the barrier request is set for the request in block 804, the DE determines whether a barrier is pending for the channel (block 808). If a barrier is not pending, the DE toggles the barrier tag (block 810) and issues the DMA request to the BE (block 806). Then, operation returns to block 802 to wait until a DMA request is ready to issue on the channel.

If a barrier is pending for the channel in block 808, then the DE determines whether a barrier clear signal is received for the DMA channel from the BE (block 812). If a barrier clear signal is not received, operation returns to block 812 to wait for the BE to issue a barrier clear signal for the channel. If a barrier clear signal is received in block 812, operation proceeds to block 810 to toggle the barrier tag, then proceeds to block 806 to issue the DMA request to the BE. Thereafter, operation returns to block 802 to wait until a DMA request is ready to issue on the channel.

Figure 9A:
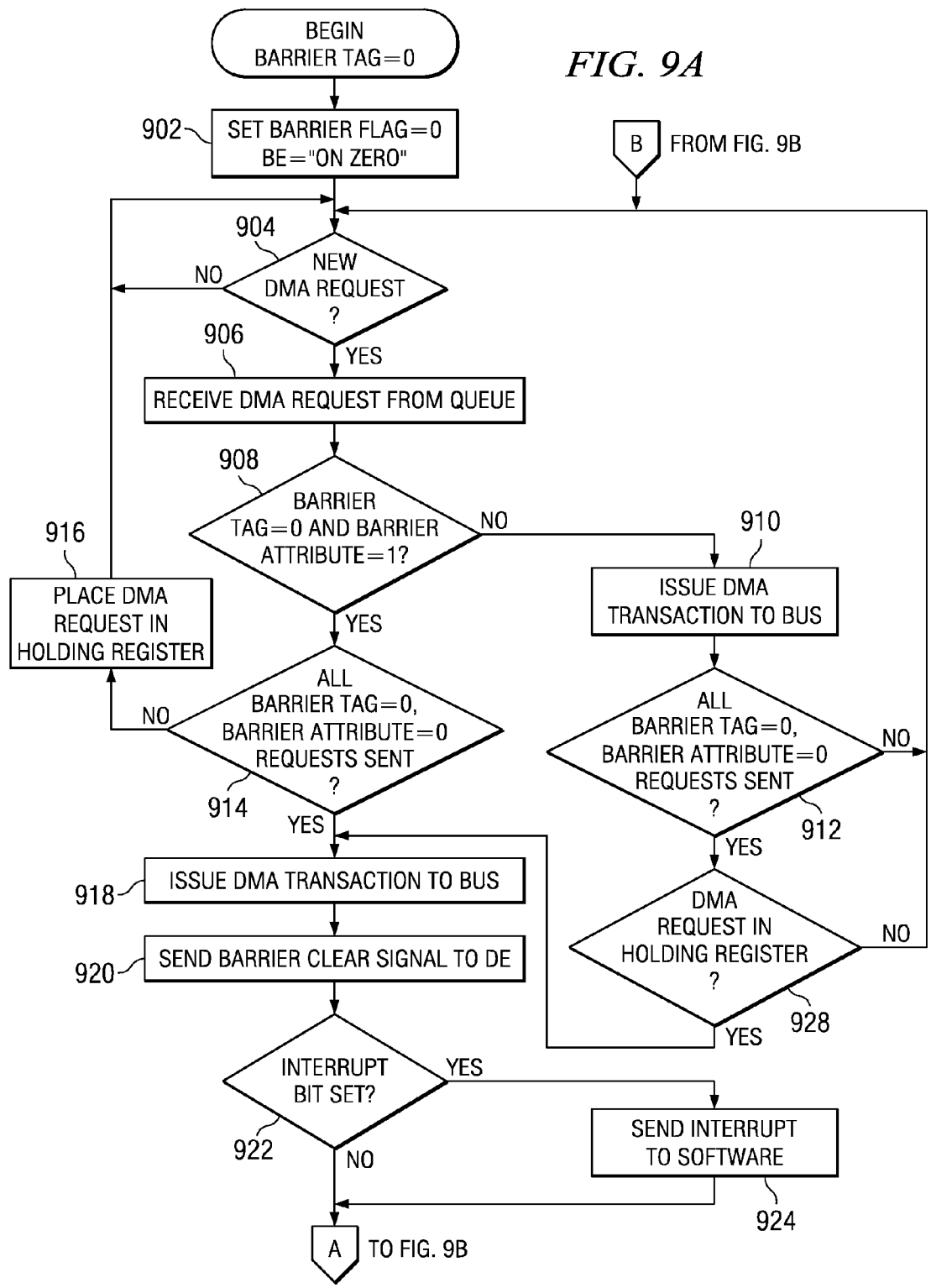

FIGS. 9A and 9B are flowcharts illustrating operation of a bus engine enforcing a barrier in accordance with an illustrative embodiment. With reference to FIG. 9A, operation begins with the barrier tag set to zero. The BE sets the barrier flag to zero (0), and the BE is said to be "on zero" (block 902). Then, the BE determines whether a new DMA request is available (block 904). If a new DMA request is not available, operation returns to block 904 to wait for a new DMA request.

If a new DMA request is available in block 904, the BE receives the DMA request from the queue (block 906). The BE determines whether the barrier tag is set to zero and the barrier attribute is set to one for the request (block 908). If the barrier tag is set to one, meaning that the request is on the other side of the barrier, or the barrier attribute is set to zero, meaning the request is not a barrier, then the BE issues the DMA transaction to the bus (block 910).

Next, the BE determines whether all transactions with barrier tag set to zero (0) and the barrier attribute set to zero (0) have been sent (block 912). That is, the BE determines whether all transactions for a barrier descriptor have been processed except the transaction with the barrier attribute set. If this not the case, then operation returns to block 904 to determine whether a new DMA request is available.

Returning to block 908, if the barrier tag is set to zero and the barrier attribute is set to one, meaning the transaction is the barrier transaction, then the BE determines whether all transactions with barrier tag set to zero (0) and the barrier attribute set to zero (0) have been sent (block 914). If all transactions for the barrier descriptor have not been processed in block 914, then the BE places the DMA request in a holding register (block 916). Then, operation returns to block 904 to determine whether a new DMA request is available.

If the current transaction has the barrier descriptor set, and all transactions for the barrier descriptor except for the transaction with the barrier attribute set have been processed in block 914, the BE issues the DMA transaction to the bus (block 918). Next, the BE sends a barrier clear signal to the DE (block 920). The BE then determines whether the interrupt bit is set for the DMA request (block 922). It the interrupt bit is set, the BE sends an interrupt to the software (block 924). Thereafter, or if the interrupt bit is not set in block 922, the BE sets the barrier flag equal to one (1), and the BE is said to be "on one" (block 926 in FIG. 9B). Then, operation proceeds to block 930 to be described in further detail below.

Returning to block 912, if the BE issues a DMA transaction to the bus for which the barrier attribute is not set in block 910, but all DMA requests with the barrier attribute not set for the "on zero" barrier have been processed in block 912, the BE determines whether a DMA request is being held for the DMA channel in a holding register (block 928). If a DMA request is not being held for the channel, operation returns to block 904 to determine whether a new DMA request is available. If, however, a DMA request is being held for the channel in block 928, operation proceeds to block 918 to issue the transaction to the bus, send a barrier clear signal (block 920), and send an interrupt to the software if the interrupt bit is set (blocks 922 and 924). Then, operation proceeds to block 926.

Turning to FIG. 9B, the BE sets the barrier flag equal to one (1), and the BE is said to be "on one" (block 926). The BE determines whether a new DMA request is available (block 930). If a new DMA request is not available, operation returns to block 930 to wait for a new DMA request.

If a new DMA request is available in block 930, the BE receives the DMA request from the queue (block 932). The BE determines whether the barrier tag is set to one and the barrier attribute is set to one for the request (block 934). If the barrier tag is set to zero, meaning that the request is on the other side of the barrier, or the barrier attribute is set to zero, meaning the request is not a barrier, then the BE issues the DMA transaction to the bus (block 936).

Next, the BE determines whether all transactions with barrier tag set to one (1) and the barrier attribute set to zero (0) have been sent (block 938). That is, the BE determines whether all transactions for a barrier descriptor have been processed except the transaction with the barrier attribute set. If this not the case, then operation returns to block 930 to determine whether a new DMA request is available.

Returning to block 934, if the barrier tag is set to one and the barrier attribute is set to one, meaning the transaction is the barrier transaction, then the BE determines whether all transactions with barrier tag set to one (1) and the barrier attribute set to zero (0) have been sent (block 940). If all transactions for the barrier descriptor have not been processed in block 940, then the BE places the DMA request in a holding register (block 942). Then, operation returns to block 930 to determine whether a new DMA request is available.

If the current transaction has the barrier descriptor set, and all transactions for the barrier descriptor except for the transaction with the barrier attribute set have been processed in block 940, the BE issues the DMA transaction to the bus (block 944). Next, the BE sends a barrier clear signal to the DE (block 946). The BE then determines whether the interrupt bit is set for the DMA request (block 948). If the interrupt bit is set, the BE sends an interrupt to the software (block 950). Thereafter, or if the interrupt bit is not set in block 948, the BE sets the barrier flag equal to zero (0), and the BE is said to be "on zero" (block 952). Then, operation proceeds to block 904 in FIG. 9A.

Returning to block 938, if the BE issues a DMA transaction to the bus for which the barrier attribute is not set in block 936, but all DMA requests with the barrier attribute not set for the "on zero" barrier have been processed in block 938, the BE determines whether a DMA request is being held for the DMA channel in a holding register (block 954). If a DMA request is not being held for the channel, operation returns to block 930 to determine whether a new DMA request is available. If, however, a DMA request is being held for the channel in block 954, operation proceeds to block 944 to issue the transaction to the bus, send a barrier clear signal, and send an interrupt to the software if the interrupt bit is set. Then, operation proceeds to block 904 in FIG. 9A.

Thus, the illustrative embodiments solve the disadvantages of the prior art by providing a DMA device that is structured as a loosely coupled DMA engine (DE) and a bus engine (BE). The DE breaks the programmed data block moves into separate transactions, interprets the scatter/gather descriptors, and arbitrates among channels. The BE understands the bus protocol of the bus to which the DMA device is attached and runs all of the transactions sent by the DE. The DE and BE may make the process more efficient by using a combined read-write (RW) command that can be queued between the DE and the BE. However, the DE and BE may also operate with independent read and write commands.

The DMA device includes a barrier and interrupt mechanism that allows interrupt and mailbox operations to occur in such a way that ensures correct operation, but still allows for high performance out-of-order data moves to occur whenever possible. Certain descriptors are defined to be "barrier descriptors." When the DMA device encounters a barrier descriptor, it ensures that all of the previous descriptors complete before the barrier descriptor completes. The DMA device further ensures that any interrupt generated by a barrier descriptor will not assert until the data move associated with the barrier descriptor completes.

The DMA controller only permits interrupts to be generated by barrier descriptors. Single programming data block moves are treated as barrier descriptors in this regard. This allows software to reliably use interrupts it receives, because by the time it receives the interrupt, all of the data that it was expecting to be moved is guaranteed to have been moved.

The barrier descriptor concept also allows software to embed mailbox completion messages into the scatter/gather linked list of descriptors. The mechanism simply labels each completion message as a barrier descriptor. The mechanism ensures that those completion messages are not delivered until all previous descriptors have completed.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a direct memory access engine in a direct memory access device for performing a direct memory access block move, the method comprising:
   receiving a direct memory access block move descriptor, wherein the direct memory access block move descriptor indicates a source and a target and wherein the direct memory access block move descriptor is identified as a barrier descriptor;
   converting the direct memory access block move descriptor into one or more direct memory access requests for the direct memory access block move descriptor;
   identifying a last direct memory access request within the one or more direct memory access requests;
   setting a barrier attribute for the last direct memory access request to mark a barrier; and
   for each given direct memory access request in the one or more direct memory access requests:
   determining whether the barrier attribute is set for the given direct memory access request;
   responsive to a determination that the barrier attribute is set, determining whether a barrier is pending for a channel of the given direct memory access request; and
   responsive to a determination that a barrier is not pending for the channel of the given direct memory access request, issuing the given direct memory access request to a bus engine in the direct memory access device.

2. The method of claim 1, further comprising:
   responsive to a determination that the barrier attribute is not set for a given direct memory access request, issuing the given direct memory access to the bus engine.

3. The method of claim 1, further comprising:
   responsive to a determination that a barrier is pending for the channel of a given direct memory access request having the barrier attribute set, holding the given direct memory access request until a barrier clear signal is received from the bus engine for the channel of the given direct memory access request; and
   responsive to a barrier clear signal being received from the bus engine for the channel of the given direct memory access request, issue the given direct memory access request to the direct memory access queue.

4. The method of claim 1, further comprising:
   responsive to issuing a given direct memory access request to the bus engine, toggling a barrier tag, such that direct memory access requests on a first side of the barrier have a barrier tag set to a first value and direct memory requests on a second side of the barrier have a barrier tag set to a second value.

5. The method of claim 1, wherein the direct memory access block move descriptor has an interrupt bit set, the method further comprising:
   setting an interrupt bit for the last direct memory access request.

6. A method in a bus engine in a direct memory access device for performing a direct memory access block move, the method comprising:
   receiving a direct memory access request from a direct memory access queue, wherein a direct memory access engine in the direct memory access device converts a direct memory access block move descriptor into one or more direct memory access requests, sets a barrier attribute for a last direct memory access request within the one or more direct memory access requests to mark a barrier, and stores the one or more direct memory access requests in the direct memory access queue;
   determining whether the received direct memory access request has a barrier attribute set;
   responsive to a determination that the received direct memory access request has a barrier attribute set, determining whether all direct memory access requests before the barrier have completed; and
   responsive to a determination that all direct memory access requests before the barrier have not completed, holding the received direct memory access request from completing.

7. The method of claim 6, further comprising:
   responsive to a determination that the received direct memory access request is after the barrier and does not have a barrier attribute set, issuing a direct memory access transaction for the received direct memory access request to a bus.

8. The method of claim 6, further comprising:
   responsive to a determination that the received direct memory access request is before the barrier and does not have a barrier attribute set, issuing a direct memory access transaction for the received direct memory access request to a bus.

9. The method of claim 8, further comprising:
responsive to issuing the direct memory access transaction, determining whether all direct memory access requests before the barrier without the barrier attribute being set have completed;
responsive to a determination that all direct memory access requests before the barrier without the barrier attribute being set have completed, determining whether a barrier direct memory access request with the barrier attribute set is being held from completing; and
responsive to a determination that a barrier direct memory access request with the barrier attribute set is being held from completing, issuing a direct memory access transaction for the barrier direct memory access request to the bus.

10. The method of claim 9, further comprising:
responsive to issuing the direct memory transaction for the barrier direct memory request, determining whether an interrupt bit is set for the barrier direct memory request; and
responsive to a determination that an interrupt bit is set for the barrier direct memory access request, generating an interrupt.

11. A direct memory access device, comprising:
a direct memory access engine, wherein the direct memory access engine is configured to:
  receive a direct memory access block move descriptor, wherein the direct memory access block move descriptor indicates a source and a target and wherein the direct memory access block move descriptor is identified as a barrier descriptor;
  convert the direct memory access block move descriptor into one or more direct memory access requests for the direct memory access block move descriptor;
  identify a last direct memory access request within the one or more direct memory access requests;
  set a barrier attribute for the last direct memory access request to mark a barrier; and
  issue the one or more direct memory access requests to a direct memory access queue; and
a bus engine, wherein the bus engine is configured to:
  receive a direct memory access request from the direct memory access queue;
  determine whether the received direct memory access request has a barrier attribute set;
  responsive to a determination that the received direct memory access request has a barrier attribute set, determine whether all direct memory access requests before the barrier have completed; and
  responsive to a determination that all direct memory access requests before the barrier have not completed, hold the received direct memory access request from completing.

12. The direct memory access device of claim 11, wherein the direct memory access engine is further configured to:
responsive to a determination that a barrier is pending for a channel of a given direct memory access request having the barrier attribute set, hold the given direct memory access request until a barrier clear signal is received from the bus engine for the channel of the given direct memory access request; and
responsive to a barrier clear signal being received from the bus engine for the channel of the given direct memory access request, issue the given direct memory access request to the direct memory access queue.

13. The direct memory access device of claim 11, wherein the direct memory access engine is further configured to:
responsive to issuing a given direct memory access request to the bus engine, toggle a barrier tag, such that direct memory access requests on a first side of the barrier have a barrier tag set to a first value and direct memory access requests on a second side of the barrier have a barrier tag set to a second value.

14. The direct memory access device of claim 11, wherein the bus engine is further configured to:
responsive to a determination that the received direct memory access request is before the barrier and does not have a barrier attribute set, issue a direct memory access transaction for the received direct memory access request.

15. The direct memory access device of claim 14, wherein the bus engine is further configured to:
responsive to issuing the direct memory access transaction, determine whether all direct memory access requests before the barrier direct memory access request without the barrier attribute being set have completed;
responsive to a determination that all direct memory access requests before the barrier direct memory access request without the barrier attribute being set have completed, determine whether the barrier direct memory access request is being held from completing; and
responsive to a determination that the barrier direct memory access request is being held from completing, issue a direct memory access transaction for the barrier direct memory access request.

16. The method of claim 9, further comprising:
responsive to issuing the direct memory transaction for the barrier direct memory request, sending a barrier clear signal to the direct memory access engine.

17. The direct memory access device of claim 11, wherein the direct memory access block move descriptor has an interrupt bit set, wherein the direct memory access engine is further configured to:
set an interrupt bit for the last direct memory access request.

18. The direct memory access device of claim 11, wherein the bus engine is further configured to:
responsive to a determination that the received direct memory access request is after the barrier and does not have a barrier attribute set, issuing a direct memory access transaction for the received direct memory access request to a bus.

19. The direct memory access device of claim 15, wherein the bus engine is further configured to:
responsive to issuing the direct memory transaction for the barrier direct memory request, determine whether an interrupt bit is set for the barrier direct memory request; and
responsive to a determination that an interrupt bit is set for the barrier direct memory access request, generate an interrupt.

20. The direct memory access device of claim 15, wherein the bus engine is further configured to:
responsive to issuing the direct memory transaction for the barrier direct memory request, send a barrier clear signal to the direct memory access engine.

* * * * *